March 18, 1958    G. C. SPARKS    2,827,219
CONTAINER INSERT
Filed Oct. 4, 1956    2 Sheets-Sheet 2

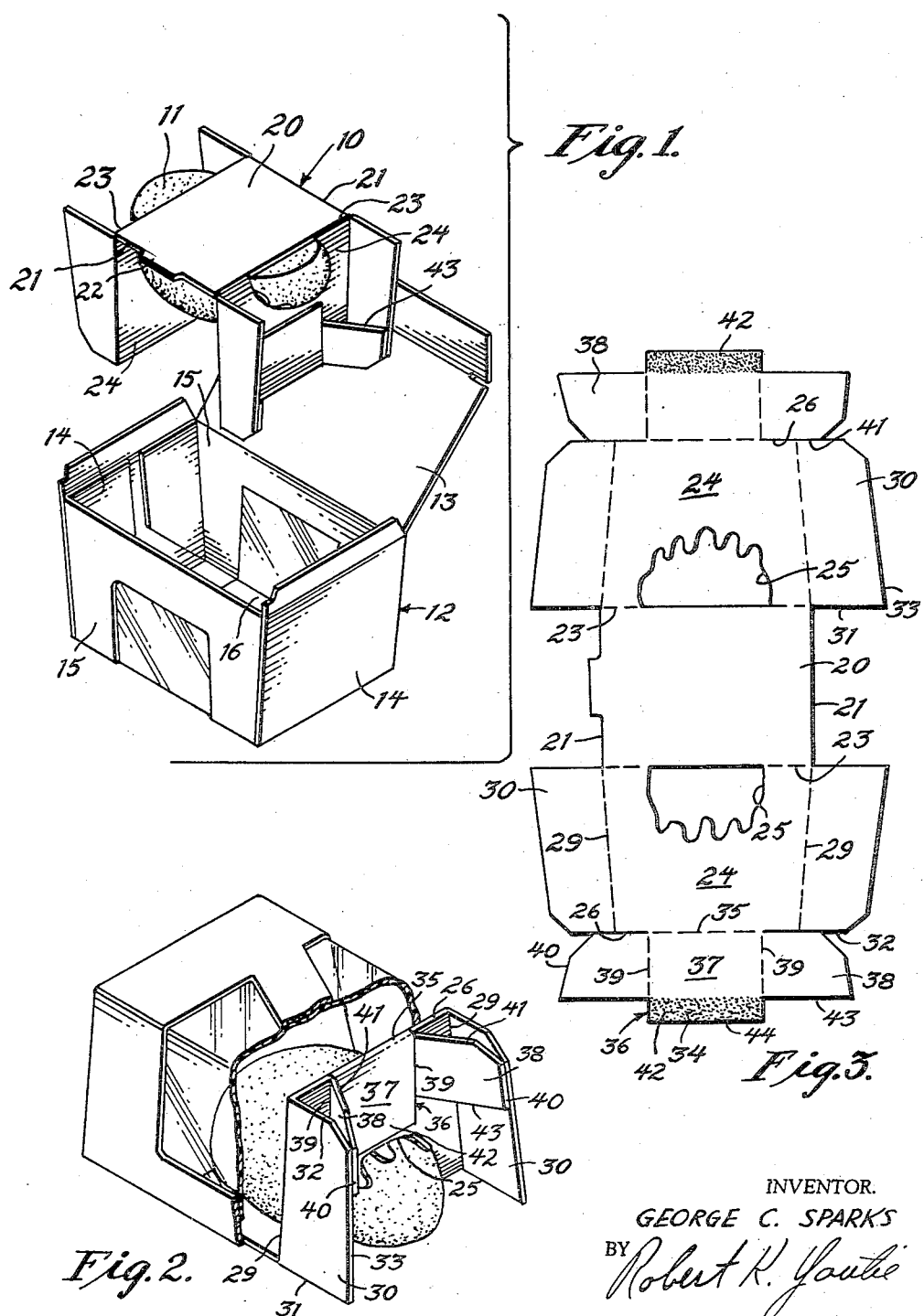

INVENTOR.
GEORGE C. SPARKS
BY Robert K. Youte
ATTORNEY.

United States Patent Office 2,827,219
Patented Mar. 18, 1958

2,827,219

CONTAINER INSERT

George C. Sparks, Philadelphia, Pa.

Application October 4, 1956, Serial No. 613,986

5 Claims. (Cl. 229—14)

This invention relates generally to containers, and is particularly directed to article supporting container inserts. The instant invention is an improvement over the article supporting container insert disclosed in my prior U. S. Patent No. 2,744,622.

While the insert of said patent has proved highly advantageous over all, it has been found necessary to fabricate the prior insert of relatively strong, heavy cardboard stock, especially when the insert is used with certain articles, such as candy Easter eggs. Although the less expensive grade of heavy cardboard stock may satisfactorily fulfill the structural requirements of the insert, such stock may be undesirable by reason of its appearance, and also for its tendency to produce objectionable odors. In order to overcome these disadvantages, it has heretofore been necessary to employ relatively heavy stock made of pure virgin wood fibres, which stock is relatively expensive and contributes excessively to the total container cost.

Also in the insert of the above mentioned patent, it was necessary during manufacture to apply adhesive by means of stencil gluing or timed gluing, in order to periodically apply glue to only certain parts and omit the application of glue to other parts. That is, it was necessary to apply glue periodically or intermittently, which is a slow and expensive procedure, rather than by the relatively fast and low cost method of straight line gluing.

Accordingly, it is one object of the present invention to overcome the above mentioned disadvantages of the prior art, and produce an improved article supporting container insert adapted to be manufactured from relatively lightweight cardboard stock, without sacrificing structural strength, to thereby effect a substantial savings in the cost of materials.

It is a further object of the present invention to provide an article supporting container insert wherein the application of glue is adapted to be performed entirely by the straight line gluing procedure, so that relatively high production speeds are accomplished at substantial savings in labor and overhead costs.

It is another object of the present invention to provide a relatively simple and inexpensive, one-piece blank adapted to be quickly and easily formed into the container insert of the present invention.

It is still a further object of the present invention to provide a container insert having the advantageous characteristics mentioned in the foregoing paragraphs which is extremely simple in construction, neat and attractive in appearance, and highly effectual to structurally reinforce its associated container.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is an exploded, perspective view showing in inverted condition a container, and an article supporting insert constructed in accordance with the present invention;

Figure 2 is a top perspective view showing an insert of the invention received in a container, with the container partially broken away for clarity of understanding;

Figure 3 is a plan view illustrating a blank adapted to be formed into the insert of Figures 1 and 2;

Figure 4:
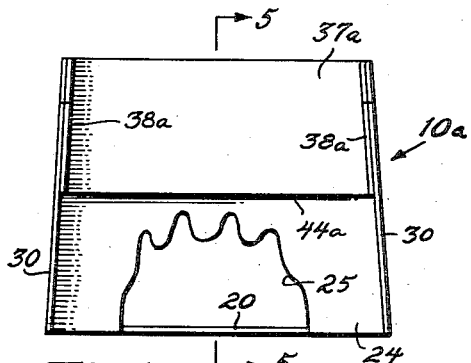
Figure 4 is an end view of a slightly modified form of insert of the present invention.

Referring now more particularly to the drawings, and specifically to Figure 1 thereof, 10 designates generally an insert of the present invention carrying an article 11, which is shown for purposes of illustration and having an egg-shaped configuration. The insert 10 in Figure 1 is inverted and adapted for snug reception in a container, generally designated 12, which is also inverted and may be of the bottom opening type shown in my prior Patent No. 2,744,622. The container 12 includes a closure 13, which in closed condition defines the container bottom. The container also includes facing spaced container ends 14, laterally spaced container sides 15, and a container top 16. Thus, the container 12 is of hexahedral configuration and may have trapezoidal sides and ends, as illustrated, or other desired face configurations. In particular, the container bottom and top are illustrated as being of generally rectangular configuration, while the sides and ends are of generally trapezoidal configuration tapering from the bottom toward the top.

As seen in Figures 1 and 2, the insert 10 includes a generally rectangular bottom wall or base 20 having generally parallel opposite side edges 21. Projecting laterally outward from one of the side edges 21 may be provided a locking tab 22 such as that disclosed in said prior patent.

Hingedly connected to opposite ends or end edges of the base 20, as by parallel fold lines 23 terminating at the side edges 21 are a pair of upstanding end walls 24. That is, the end walls 24, which are illustrated as being of generally trapezoidal configuration, are substantially identical, and extend generally vertically upward in parallel spaced, facing relation with each other from opposite ends of the base 20, being hinged to the latter. An opening 25 may be formed in the lower central region of each end wall 24 for snugly receiving an end portion of the article 11 when the latter rests on the base 20. The end walls 24 are advantageously configured to have their sides or side edges, which are defined by fold lines 29, disposed contiguous to the container sides 15 for snug engagement therein, and further to have their upper edges 26 contiguous to the container top 16 for engagement with the latter, all when the insert 10 is received in the container.

Hinged to opposite sides or side edges of each end wall 24, as by the folds 29, and extending outward therefrom longitudinally of the base 20 and container 12 so as to be in laterally spaced facing relation with respect to each other, are a pair of wings 30. The wings 30 each have their lower and upper edges 31 and 32 parallel for respective engagement with the bottom and top of the container when the insert is disposed within the closed container. The outer edge 33 of each wing 30 is shaped for conforming engagement with the adjacent container end 14 when the insert is located interiorly of the container.

Hinged on the upper edge 26 of each end wall 24, as at 35, and depending therefrom in the spaced between each facing pair of wings 30, is a reinforcement, generally designated 36. More specifically, each reinforcement 36 includes a medial portion or section 37 which is hinged to the upper edge of the adjacent end wall, as by the fold line 35 which terminates at its opposite ends short of the end wall side edges 29; and, the reinforcement depends from its hinged connection in facing engagement with the outer surface of the adjacent end wall. Extending from opposite side edges of each medial reinforcement portion 37 are a pair of outer portions or lateral extensions 38, which are connected to the medial portion by hinge-defining fold lines 39 each extending from a respective opposite end of the fold line 35 and substantially normal to the latter. As may be observed in Figures 1 and 2, the outer reinforcement portions 38 extend obliquely away from the medial reinforcement portion 37 and diverge from each other longitudinally of the insert, terminating at the outer ends or end edges 40 contiguous to the outer edges 33 of the respective wings 30. Further, the upper edges 41 of the outer reinforcement portions 38 are substantially coplanar with the upper edges 26 and 32 of the adjacent end wall and wings. Thus, each reinforcement 36 extends along the upper regions of its adjacent end wall and wing. Moreover, in the embodiment of Figures 1 and 2, the outer reinforcement portions 38 terminate at their lower edges 43 short of the lower edge 44 of the medial reinforcement portion 37, to define a depending securement tab 42 on the medial portion which may be adhesively secured to the adjacent end wall 24 to retain the medial reinforcement portion in its facing engagement with the end wall.

When the insert 10 is received in its container 12, the condition illustrated in Figure 2, the generally rectangular base 20 is seated in facing engagement on the container bottom 13 with side edges 21 of the base contiguous to and in conforming engagement with the container sides 15. The insert end walls 24 are shaped so that their side edges, as defined by the fold lines 29, extend upward contiguous to and in conforming engagement with the container sides 15, while the upper end wall edges 26 extend laterally across in contiguous, conforming engagement with the container top wall 16. Further, each wing 30 has its lower, upper and outer edges 31, 32, and 33 shaped for conforming engagement, respectively, with the container bottom, top and adjacent end. The upper edges 41 of the reinforcement portions 38, being coplanar with the upper edges 26 and 32 of the adjacent end wall and wings, are contiguous to and engageable with the container top, while the outer reinforcement extension edges 40 are shaped for engagement with the adjacent container end 14. By this construction, both the container ends and top wall are reinforced against external pressure by the outer reinforcement portions 38, while the insert end walls 24 have their upper regions reinforced and strengthened by the medial reinforcement portions 37.

In Figure 3 is illustrated a blank from which the insert 10 may be formed. The blank of Figure 3 is preferably fabricated of a single sheet of stiff, bendable material, such as relatively thin pure virgin wood fiber stock, or other suitable cardboard, and includes a generally rectangular, centrally located main panel 20 adapted to form the base of the insert. The main panel 20 is bounded by opposed side edges 21 and opposed end edges 23, the latter being defined by fold lines or creases extending between and terminating at the side edges. Hingedly connected to opposite end edges of the main panel 20, as by the fold lines 23, are a pair of auxiliary panels 24 adapted to form the insert end walls when folded into facing spaced relation with respect to each other. Each of the auxiliary panels 24 is formed with an article-receiving opening 25 contiguous to the main panel 20 and spaced inwards from the auxiliary panel side edges. It will be noted that the auxiliary panels 24 are each laterally co-extensive with the adjacent end edge of the main panel 20, at the hinged connections to the latter, and may converge outwards in generally trapezoidal configuration, if desired. More specifically, each of the auxiliary, end-wall-forming panels 24 is bounded at its inner end by a fold line 23, along its side edges by outwardly converging fold lines 29, and along its end edge by a medial fold line 35 extending parallel to the inner fold line 23 and free edges 26 continuing from opposite ends of the fold 35 in alignment therewith and terminating at the folds 29.

Hinged on opposite sides of each auxiliary panel 24, as by the fold lines 29, are a pair of substantially identical wings 30. Each of the wings 30 is longitudinally co-extensive with its associated auxiliary panel 24, having its opposite edges 31 and 32 extending laterally outward from opposite ends of the hinged connection or fold line 29 and in alignment, respectively, with the fold 23 and edge 26. The laterally outer edge 33 of each wing 30 extends between the longitudinally inner and outer edges 31 and 32.

A reinforcement flap 36 is hingedly connected, as by each fold line 35 to the distal edge of each auxiliary panel 24. Each flap 35 includes a generally rectangular medial portion 37 bounded by its adjacent fold line 35, a pair of generally parallel fold lines 39 extending longitudinally outward from opposite ends of the associated fold line 35, and an end extension or glue tab 34 terminating at the end edge 44 and extending laterally between the fold lines 39. Hingedly connected to each medial flap portion 37 on opposite sides thereof, as by the fold lines 39, are a pair of outer flap portions 38, each of which has its longitudinally inner edge 41 extending laterally outward in alignment with the hinged fold-line connection 35, and terminates in a laterally outer edge 40. That is, the outer flap portions 38 terminate at their laterally outer edges 40 outward beyond the side edges of the auxiliary panel 24, defined by the fold lines 29, and laterally inward of the wing edges 33. The longitudinally outer edge 43 of each flap portion 38 is spaced longitudinally inward of the medial portion edge 44, to define the glue tab 34 on the medial flap portion.

In erecting the insert 10 from the blank of Figure 3, it is only necessary to swing the flaps 36 inward about their hinged connections 35 into facing engagement with the adjacent auxiliary panel 24 and adhesively secure the tabs 34 to the respective auxiliary panels. The auxiliary panels are then swung inward toward each other about their hinged connections 23, with the flaps 36 on the non-facing sides of the auxiliary panels, and the wings 30 are swung about their hinged connections 39 to extend longitudinally outward away from the main panel or base 20. Swinging of the wings 30 will serve to swing the outer flap extensions 38 to their oblique disposition about their respective hinged connections 39. It will now be understood that the main panel 20 defines the insert base, while the auxiliary panels 24 serve as the insert end walls, and the flaps 36 define the reinforcements described in connection with Figures 1 and 2.

In practice, it is highly advantageous to configure the reinforcement flaps 36 as illustrated in Figure 3, wherein the glue tabs 34 project longitudinally outward beyond the lateral extensions 38. By this construction, glue or other suitable adhesive may be applied as at 42 to the tabs 34 by the relatively rapid straight-line gluing process, without the application of glue to any other, undesired parts of the blank. Further, the reinforcement flaps may be quickly, easily and completely automatically swung about their hinged connections 35 and secured in facing engagement with the end wall panels 24. In this completely flat condition, the blanks may be stored or shipped in a minimum of space; and, erection to the insert condition of Figures 1 and 2 may be quickly and easily effected during the packaging procedure.

Figure 5:
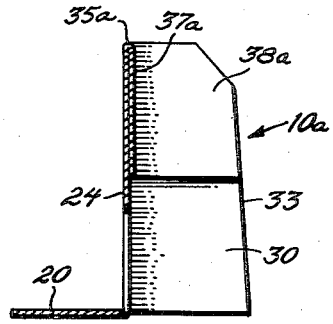
Figure 5 is a sectional view taken substantially along the line 5—5 of Figure 4.
Figure 6:
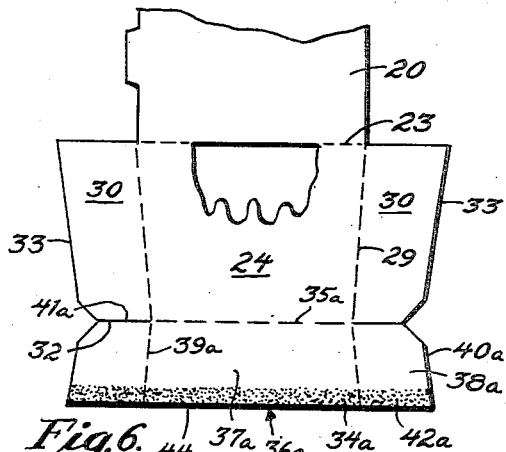
Figure 6 is a partial plan view showing a blank adapted to be formed into the insert of Figures 4 and 5.

In Figure 6 is shown a partial plan view of a slightly modified form of blank adapted to be formed into the insert, generally designated 10a of Figures 4 and 5. As the blank and resulting insert are symmetrical, the figures are fully illustrative. The blank of Figure 6 is substantially identical to that of Figure 3, with the exception of the reinforcement flap 36a.

That is, the blank of Figure 6 includes a main panel 20 adapted to form the insert base, a pair of auxiliary panels 24 hinged to opposite ends of the main panel 20 by the fold lines 23, and a pair of laterally outwardly projecting wings 30, each hinged to a respective side edge of the adjacent auxiliary panel 24 by a fold line 29, all the same as in Figure 3.

The auxiliary panel 24, which of course is identical to another auxiliary panel (not shown) on the other end of the main panel, is bounded on its longitudinally outer or distal edge by a fold line 35a extending parallel to the fold lines 23, and terminating at its opposite ends at the side edge fold lines 29. The flap 36a, which is of course identical to another flap (not shown) on the distal end of the other auxiliary panel 24, includes a medial portion 37a hinged to the auxiliary panel 24 by the fold line 35a and laterally co-extensive with the auxiliary panel at its distal edge. The medial flap portion 37a is bounded on opposite side edges by a pair of generally longitudinally extending folds 39a each extending from a respective end of the fold 35a generally outward longitudinally of the blank 10a. Hingedly connected on opposite sides of the medial flap portion 37a, as by the fold lines 39a, are a pair of laterally outer flap portions 38a. The flap portions 38a terminate at their laterally outer edges 40a, respectively, generally coterminous with the laterally outer edges 33 of the adjacent wings 30, while their longitudinally inner edges 41a are in substantial alignment with the fold line 35a, and their longitudinally outer edges 43a are in substantial alignment with the longitudinally outer edge 44a of the medial flap portion.

Along the aligned longitudinally outer or end edges of the medial and laterally and outer flap portions are applied a laterally extending line of adhesive 42a. Obviously, this line of adhesive may also be applied by the straight-line gluing method; and, it is only necessary to swing the flaps 36a inward about their respective hinged connections 35a to adhesively secure the flaps in facing engagement with the adjacent end wall and wings 30.

As seen in Figures 4 and 5, the configuration and dimensions of the flaps 36a are such that the flaps are each disposed in the space intermediate a facing pair of wings 30, and extend along the upper regions of the adjacent end wall and wings, having their upper edges, as defined by the outer flap portion edges 41a substantially coplanar with the upper wing edges 32. Moreover, the laterally outer edges 40a of the outer flap portions 38a are shaped to extend continuously along the laterally outer edges 33 of the respective wing 30. Hence, the flaps 36a serve to reinforce the end walls and wings against bending, and further serve to reinforce the container ends and top against external loads applied thereto.

Figure 9:
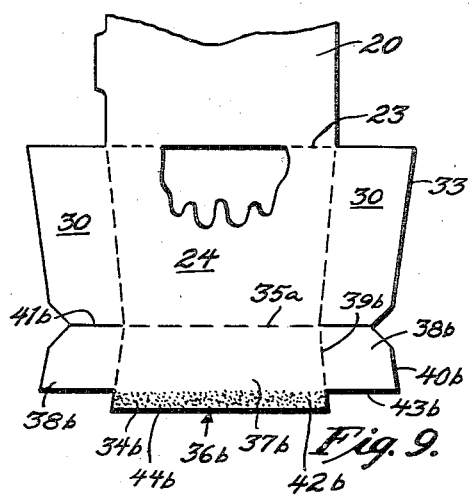
Figure 9 is a partial plan view showing a blank adapted to be formed into the insert of Figures 7 and 8.
Figure 7:
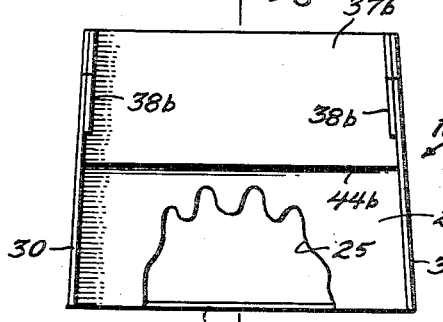
Figure 7 is an end view showing another slightly modified form of insert of the present invention.
Figure 8:
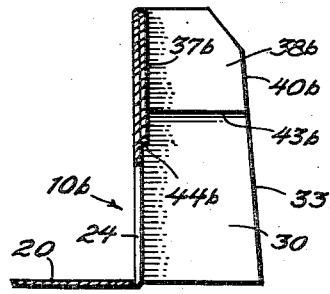
Figure 8 is a vertical sectional view taken substantially along the line 8—8 of Figure 7.

A slightly modified form of blank is illustrated in Figure 9, which is adapted to be made into the insert 10b of Figures 7 and 8. The blank of Figure 9 is substantially identical to that of Figure 6, with the exception of the reinforcement flaps 36b. More particularly, the flap 36b of the blank of Figure 9, only one being shown in the drawing, include a medial portion 37b which is substantially identical to the medial flap portion 37a of Figure 6, and a pair of laterally outer flap portions 38b hinged to opposite sides of the medial flap portion 37b by a pair of fold lines 39b extending generally longitudinally outward from opposite ends of the hinged flap connection 35a. The outer, end edge portion or glue tab 34b of the medial flap section 37b is coated with a laterally extending line of adhesive 42b as is the outer edge margin of the medial flap portion 37a of Figure 6, but the longitudinally outer or end edge regions of the laterally outer portions 38b are cut away longitudinally inward, so as to terminate longitudinally inward of the adhesive material. That is, the end edges 43b of the laterally outer tab flap portions 38b are recessed inward relative to the end edge 44b of the medial flap portion, so that the adhesive-coated flap portion defines a tab 34b projecting longitudinally outward relative to the blank. The outwardly projecting tab portion 34b of the medial flap section 37b may be coated with adhesive, as at 42b, by the straight-line gluing method, as mentioned hereinbefore in connection with the projecting tab of the blank of Figure 3. In Figure 9, the laterally outer edges 40b of the outer flap portions 38b are in substantial longitudinal alignment with the outer edges 33 of the wings 30, so that the edges 40b will lie along and in contiguous relation with the edges 33 when the flaps 36b are swung about their hinged connections 35a. Also, the longitudinally inner edges 41b of the laterally outer flap portions 38b extend from opposite ends of and are in substantial longitudinal alignment with the hinged connection 38b.

Hence, as seen in Figures 7 and 8, when the flaps 36b are swung about their hinged connections 35a into facing engagement with the adjacent auxiliary or end wall panel 24, and the blank folded along the lines 23 and 29 as described hereinbefore, each flap will be disposed in the space between a facing pair of wings extending along the upper regions of the adjacent end wall and wings, with the upper edges of the flaps substantially coplanar with the upper edges of the end wall and wings, and the outer flap edges extending along and contiguous to the outer wing edges. Hence, the blank of Figure 9, and the resulting insert of Figures 7 and 8, is adapted to function as reinforcement in substantially the same manner as the first described forms of the invention.

From the foregoing it is understood that the present invention provides an article supporting container insert and blank therefor which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An article cradling insert adapted for snug reception in a container, said insert comprising a base shaped to rest on the bottom of said container with its side edges contiguous to the container sides and its end edges each adjacent to but spaced inwards from a respective container end, end walls extending upward from opposite end edges of said base and configured to have their side and top edges contiguous to the sides and top of said container, said end walls having openings for receiving opposite ends of an article on said base, a pair of laterally spaced facing wings extending from opposite side edges of each end wall outward toward the adjacent container end, said wings each being shaped to have its lower, upper and outer edges contiguous to the bottom, top and adjacent end of said container, and a reinforcement disposed in the space between each pair of said wings extending along the upper edges of the adjacent end wall and wings and fixed to the adjacent end wall for reinforcing engagement with the top of said container, each of said reinforcements comprising an extension depending from the upper edge and in facing engagement with the outer surface of the associated end wall.

2. An article cradling insert according to claim 1, each of said reinforcements further comprising a tab depending from the lower edge of said extension and adhesively secured to the adjacent end wall.

3. An article cradling insert adapted for snug reception in a hexahedral container, said insert comprising a generally rectangular base shaped to rest on the bottom of said container with its side edges contiguous to the container sides and its end edges each adjacent to but spaced inwards from a respective container end, end walls extending upward from opposite end edges of said base and configured to have their side and top edges contiguous to the sides and top of said container, said end walls having openings for receiving opposite ends of an article on said base, a pair of laterally spaced facing wings extending from opposite side edges of each end wall outward toward the adjacent container end, said wings each being shaped to have its lower, upper and outer edges contiguous to the bottom, top and adjacent end of said container, and a reinforcement disposed in the space between each pair of said wings extending along the upper regions of the adjacent end wall and wings, each of said reinforcements comprising a medial portion depending from the upper edge and secured in facing engagement with the outer surface of the associated end wall, and outer portions extending from opposite sides of said medial portion having their upper edges substantially coplanar with the upper edges of the associated end wall and wings and terminating at outer edges continguous to the outer edges of the associated wings, whereby said reinforcements are engageable with the top and end walls of said container to reinforce the same.

4. An article cradling insert adapted for snug reception in a container, said insert comprising a base shaped to rest on the bottom of said container with its side edges contiguous to the container sides and its end edges each adjacent to but spaced inwards from a respective container end, end walls extending upward from opposite end edges of said base and configured to have their side and top edges contiguous to the sides and top of said container, said end walls having openings for receiving opposite ends of an article on said base, a pair of laterally spaced facing wings extending from opposite side edges of each end wall outward toward the adjacent container end, said wings each being shaped to have its lower, upper and outer edges contiguous to the bottom, top and adjacent end of said container, and a reinforcement disposed in the space between each pair of said wings extending along the upper edges of the adjacent end wall and wings and fixed to the adjacent end wall for reinforcing engagement with the top of said container, wherein each of said reinforcements extends along the upper edge of and in facing engagement with the adjacent end wall and wings and terminates at its opposite ends contiguous to the outer edges of the adjacent wings, for reinforcing engagement with the adjacent end of said container.

5. An article cradling insert adapted for snug reception in a container, said insert comprising a base shaped to rest on the bottom of said container with its side edges contiguous to the container sides and its end edges each adjacent to but spaced inwards from a respective container end, end walls extending upward from opposite end edges of said base and configured to have their side and top edges contiguous to the sides and top of said container, said end walls having openings for receiving opposite end of an article on said base, a pair of laterally spaced facing wings extending from opposite side edges of each end wall outward toward the adjacent container end, said wings each being shaped to have its lower, upper and outer edges contiguous to the bottom, top and adjacent end of said container, and a reinforcement disposed in the space between each pair of said wings extending along the upper edges of the adjacent end wall and wings and fixed to the adjacent end wall for reinforcing engagement with the top of said container, each of said reinforcements comprising a medial region secured in facing engagement with the adjacent end wall, and outer regions extending obliquely from said medial region and terminating at their outer ends contiguous to the outer edges of the adjacent pair of wings, for reinforcing engagement with the adjacent ends of said container.

References Cited in the file of this patent

UNITED STATES PATENTS

| | | |
|---|---|---|
| 1,974,061 | Densen | Sept. 18, 1934 |
| 2,295,478 | Jason | Sept. 8, 1942 |
| 2,531,507 | Goodyear | Nov. 28, 1950 |
| 2,675,158 | Ringler | Apr. 13, 1954 |
| 2,744,622 | Sparks | May 8, 1956 |